United States Patent
Sprenger et al.

(10) Patent No.: US 10,631,012 B2
(45) Date of Patent: Apr. 21, 2020

(54) METHOD AND SYSTEM FOR IMPLEMENTING DETECTION AND VISUAL ENHANCEMENT OF VIDEO ENCODING ARTIFACTS

(71) Applicant: CenturyLink Intellectual Property LLC, Denver, CO (US)

(72) Inventors: Michael D. Sprenger, Boulder, CO (US); Zubin Ingah, Centennial, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 144 days.

(21) Appl. No.: 15/785,145

(22) Filed: Oct. 16, 2017

(65) Prior Publication Data
US 2018/0160151 A1  Jun. 7, 2018

Related U.S. Application Data

(60) Provisional application No. 62/429,493, filed on Dec. 2, 2016.

(51) Int. Cl.
*H04N 19/86*  (2014.01)
*H04N 19/68*  (2014.01)
(Continued)

(52) U.S. Cl.
CPC .......... *H04N 19/86* (2014.11); *H04N 19/117* (2014.11); *H04N 19/154* (2014.11);
(Continued)

(58) Field of Classification Search
None
See application file for complete search history.

(56) References Cited

U.S. PATENT DOCUMENTS

| 4,449,536 | A | * | 5/1984 | Weaver | A61B 5/0006 600/509 |
| 5,612,694 | A | * | 3/1997 | Jedwab | H03M 5/145 341/58 |

(Continued)

FOREIGN PATENT DOCUMENTS

CA       2705676 C  *  8/2017

OTHER PUBLICATIONS

T. Tuytelaars and L. Van Gool, "Synchronizing video sequences," Proceedings of the 2004 IEEE Computer Society Conference on Computer Vision and Pattern Recognition, 2004. CVPR 2004., Washington, DC, USA, 2004, pp. I-I. (Year: 2004).*

(Continued)

*Primary Examiner* — Jayanti K Patel
*Assistant Examiner* — Stefan Gadomski

(57) ABSTRACT

Novel tools and techniques are provided for video encoding and decoding, and, more particularly, for implementing detection and visual enhancement of video encoding artifacts. In various embodiments, an encoder might encode, using one or more encoding algorithms under test, an original video signal that is received from a video content source. The encoder might send an encoded video signal to a first decoder, which might decode the encoded video signal. A synchronization engine might receive the original video signal from the video content source, receive the decoded video signal from the first decoder, and implement frame synchronization of the received original video signal and the decoded video signal. A difference engine might generate a difference signal between the synchronized original video signal and the synchronized decoded video signal. A post processor might implement post processing of the generated difference signal, which may be displayed, to enhance video encoding artifacts.

30 Claims, 6 Drawing Sheets

(51) Int. Cl.

| | |
|---|---|
| *H04N 19/44* | (2014.01) |
| *H04N 19/172* | (2014.01) |
| *H04N 19/117* | (2014.01) |
| *H04N 19/154* | (2014.01) |
| *H04N 19/196* | (2014.01) |
| *H04N 19/30* | (2014.01) |
| *H04N 19/50* | (2014.01) |
| *H04N 19/85* | (2014.01) |
| *H04N 19/40* | (2014.01) |

(52) U.S. Cl.
CPC ......... *H04N 19/172* (2014.11); *H04N 19/196* (2014.11); *H04N 19/30* (2014.11); *H04N 19/44* (2014.11); *H04N 19/50* (2014.11); *H04N 19/68* (2014.11); *H04N 19/85* (2014.11); *H04N 19/40* (2014.11)

(56) References Cited

U.S. PATENT DOCUMENTS

| | | | | |
|---|---|---|---|---|
| 6,148,035 | A * | 11/2000 | Oishi | H04N 7/01 348/97 |
| 6,269,123 | B1 * | 7/2001 | Fujishiro | H04N 19/139 375/240.29 |
| 6,285,710 | B1 * | 9/2001 | Hurst, Jr. | H04N 5/21 348/607 |
| 6,285,716 | B1 * | 9/2001 | Knee | H04N 19/46 348/423.1 |
| 6,897,903 | B1 | 5/2005 | Hu | |
| 8,433,143 | B1 * | 4/2013 | Carson | G06T 7/41 382/218 |
| 8,526,506 | B1 * | 9/2013 | Xie | H04N 19/40 375/240.26 |
| 8,718,145 | B1 * | 5/2014 | Wang | H04N 19/12 375/240.02 |
| 10,055,671 | B2 * | 8/2018 | Bhatia | G06K 9/036 |
| 2002/0150126 | A1 * | 10/2002 | Kovacevic | G11B 27/10 370/503 |
| 2006/0245506 | A1 * | 11/2006 | Lin | H04N 19/60 375/240.29 |
| 2008/0247663 | A1 * | 10/2008 | Jacobsen | G06F 16/7854 382/266 |
| 2009/0067491 | A1 * | 3/2009 | Sun | H04N 19/132 375/240.03 |
| 2009/0067511 | A1 * | 3/2009 | Wei | H04N 17/004 375/240.29 |
| 2009/0106624 | A1 * | 4/2009 | Kondo | G11B 20/18 714/755 |
| 2009/0147143 | A1 * | 6/2009 | Sherif | G06T 7/0004 348/701 |
| 2009/0208140 | A1 * | 8/2009 | Jayant | G06T 7/0004 382/309 |
| 2009/0323803 | A1 * | 12/2009 | Gomila | H04N 19/172 375/240.02 |
| 2010/0027897 | A1 * | 2/2010 | Sole | H04N 19/176 382/232 |
| 2010/0027905 | A1 * | 2/2010 | Zhang | G06T 5/002 382/261 |
| 2010/0110199 | A1 * | 5/2010 | Winkler | H04N 7/52 348/180 |
| 2010/0118973 | A1 * | 5/2010 | Rodriguez | H04N 19/44 375/240.25 |
| 2010/0260271 | A1 * | 10/2010 | Kapoor | G06T 5/002 375/240.27 |
| 2010/0278231 | A1 * | 11/2010 | Gutman | H04N 19/172 375/240.02 |
| 2010/0309985 | A1 * | 12/2010 | Liu | H04N 19/46 375/240.25 |
| 2011/0069138 | A1 * | 3/2011 | Ali | H04N 7/152 348/14.1 |
| 2011/0249748 | A1 * | 10/2011 | Zan | H04N 19/105 375/240.16 |
| 2011/0299604 | A1 * | 12/2011 | Price | H04N 19/46 375/240.26 |
| 2012/0062797 | A1 * | 3/2012 | Segall | H04N 5/208 348/606 |
| 2012/0063694 | A1 * | 3/2012 | Segall | H04N 19/86 382/235 |
| 2012/0076429 | A1 * | 3/2012 | Segall | H04N 19/80 382/232 |
| 2012/0076430 | A1 * | 3/2012 | Segall | G06T 5/004 382/233 |
| 2012/0099642 | A1 * | 4/2012 | Sole | H04N 19/176 375/240.03 |
| 2012/0189216 | A1 * | 7/2012 | Segall | G06T 5/002 382/232 |
| 2012/0219054 | A1 * | 8/2012 | Daub | H04N 19/115 375/240.03 |
| 2013/0128979 | A1 * | 5/2013 | Jones | H04N 19/00 375/240.16 |
| 2013/0235931 | A1 * | 9/2013 | Su | H04N 19/46 375/240.12 |
| 2013/0322633 | A1 * | 12/2013 | Stone | H04S 3/00 381/2 |
| 2014/0002745 | A1 * | 1/2014 | Seshadrinathan | H04N 5/911 348/606 |
| 2014/0037202 | A1 * | 2/2014 | Choudhury | H04N 19/86 382/162 |
| 2014/0037222 | A1 * | 2/2014 | Choudhury | H04N 19/86 382/235 |
| 2014/0192068 | A1 * | 7/2014 | Hahm | H04N 19/86 345/520 |
| 2014/0219348 | A1 * | 8/2014 | Kobayashi | H04N 19/176 375/240.12 |
| 2015/0287172 | A1 * | 10/2015 | Choudhury | G06T 5/40 382/254 |
| 2015/0304526 | A1 | 10/2015 | Maurice | |
| 2015/0304657 | A1 * | 10/2015 | Lu | H04N 19/86 375/240.29 |
| 2016/0037160 | A1 * | 2/2016 | Hori | H04N 19/147 375/240.25 |
| 2016/0044315 | A1 * | 2/2016 | Sun | H04N 19/463 375/240.02 |
| 2016/0112708 | A1 * | 4/2016 | Grundy | H04N 19/136 375/240.08 |
| 2016/0212423 | A1 * | 7/2016 | Aharon | H04N 19/117 |
| 2017/0013261 | A1 * | 1/2017 | Lin | H04N 19/176 |
| 2017/0085884 | A1 * | 3/2017 | Kulkarni | H04N 19/86 |
| 2017/0085945 | A1 * | 3/2017 | Kulkarni | H04N 21/44008 |
| 2017/0094281 | A1 * | 3/2017 | Chalmers | H04N 19/46 |
| 2017/0142434 | A1 * | 5/2017 | Gu | H04N 21/44004 |
| 2017/0244951 | A1 * | 8/2017 | Ha | G06T 19/006 |
| 2018/0160166 | A1 | 6/2018 | Sprenger et al. | |
| 2018/0176577 | A1 * | 6/2018 | Puri | H04N 19/61 |

OTHER PUBLICATIONS

C. A. Segall and A. K. Katsaggelos, "Pre- and post-processing algorithms for compressed video enhancement," Conference Record of the Thirty-Fourth Asilomar Conference on Signals, Systems and Computers (Cat. No. 00CH37154), Pacific Grove, CA, USA, 2000, pp. 1369-1373 vol. 2. (Year: 2000).*

N. Bjork and C. Christopoulos, "Transcoder architectures for video coding," in IEEE Transactions on Consumer Electronics, vol. 44, No. 1, pp. 88-98, Feb. 1998. (Year: 1998).*

* cited by examiner

METHOD AND SYSTEM FOR IMPLEMENTING DETECTION AND VISUAL ENHANCEMENT OF VIDEO ENCODING ARTIFACTS

CROSS-REFERENCES TO RELATED APPLICATIONS

This application claims priority to U.S. patent application Ser. No. 62/429,493 (the "'493 Application"), filed Dec. 2, 2016 by Michael D. Sprenger et al., entitled, "Detection and Visual Enhancement of Video Encoding Artifacts," the disclosure of which is incorporated herein by reference in its entirety for all purposes.

This application may be related to: U.S. patent application Ser. No. 15/785,185 (the "'185 Application"), filed Oct. 16, 2017, by Michael D. Sprenger et al., entitled, "Method and System for Implementing Media Stream Synchronization," which claims priority to U.S. patent Application Ser. No. 62/520,249 (the "'249 Application"), filed Jun. 15, 2017 by Michael D. Sprenger et al., entitled, "Novel Method for Media Stream Synchronization"; U.S. patent application Ser. No. 15/477,812 (the "'812 Application"), filed Apr. 3, 2017 by Michael D. Sprenger et al., entitled, "Method and System for Implementing Advanced Audio Shifting," which claims priority to U.S. Patent Application Ser. No. 62/435,992 (the "'992 Application"), filed Dec. 19, 2016 by Michael D. Sprenger et al., entitled, "Advanced Audio Fading Mechanism"; U.S. patent application Ser. No. 15/785,014 (the "'014 Application"), filed Oct. 16, 2017 by Michael D. Sprenger et al, entitled, "Method and System for Implementing Automatic Audio Optimization for Streaming Services," which claims priority to U.S. Patent Application Ser. No. 62/410,269 (the "'269 Application"), filed Oct. 19, 2016 by Michael D. Sprenger et al., entitled, "Automatic Audio Optimization for Streaming Services"; U.S. patent application Ser. No. 15/477,376 (the "'376 Application"), filed Apr. 3, 2017 by Zubin Ingah et al., entitled, "Method and System for Implementing Content Navigation or Selection Using Touch-based Input," which claims priority to U.S. Patent Application Ser. No. 62/403,843 (the "'843 Application"), filed Oct. 4, 2016 by Zubin Ingah et al., entitled, "Novel Mechanism for Content Selection Using Touchscreen or Touchpad"; U.S. patent application Ser. No. 15/477,356 (the "'356 Application"), filed Apr. 3, 2017 by Michael D. Sprenger et al., entitled, "Video Quality Optimization Based on Display Capabilities," which claims priority to U.S. Patent Application Ser. No. 62/395,507 (the "'507 Application"), filed Sep. 16, 2016 by Michael D. Sprenger et al., entitled, "Video Quality Optimization Based on Display Capabilities."

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing video encoding and decoding, and, more particularly, to methods, systems, and apparatuses for implementing detection and visual enhancement of video encoding artifacts.

BACKGROUND

The raw data rate of video signals originating from video sources such as cameras is typically too high for practical transmission over operator and broadcast networks. Thus, significant efforts have been underway for decades to reduce the amount of bandwidth required to transport, store, and broadcast video signals, while retaining high visual quality. Practical video encoders (often referred to as "codecs," for coder/decoder) are inherently lossy. Ideally, these video encoders discard information typically not visible to the human eye. However, in operation, such a lossy processes introduce unwanted artifacts into the original stream, typically referred to as video encoding artifacts.

Broadcasting, telecommunications or cable operators, video and/or film production facilities, etc. are generally forced to make tradeoffs between video encoding artifacts and bandwidth requirements of the encoded signal. Finding a suitable encoding rate, while keeping visible artifacts to a minimum for most viewers is often a challenge. Traditionally, trained human observers, skilled in the art of recognizing various forms of video impairments, are required to visually determine encoding artifacts. The ability to discern, recognize, and point out video encoding artifacts can be learned over a period of time. Untrained viewers often struggle in recognizing specific types of artifacts.

Hence, there is a need for more robust and scalable solutions for implementing video encoding and decoding, and, more particularly, to methods, systems, and apparatuses for implementing detection and visual enhancement of video encoding artifacts.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
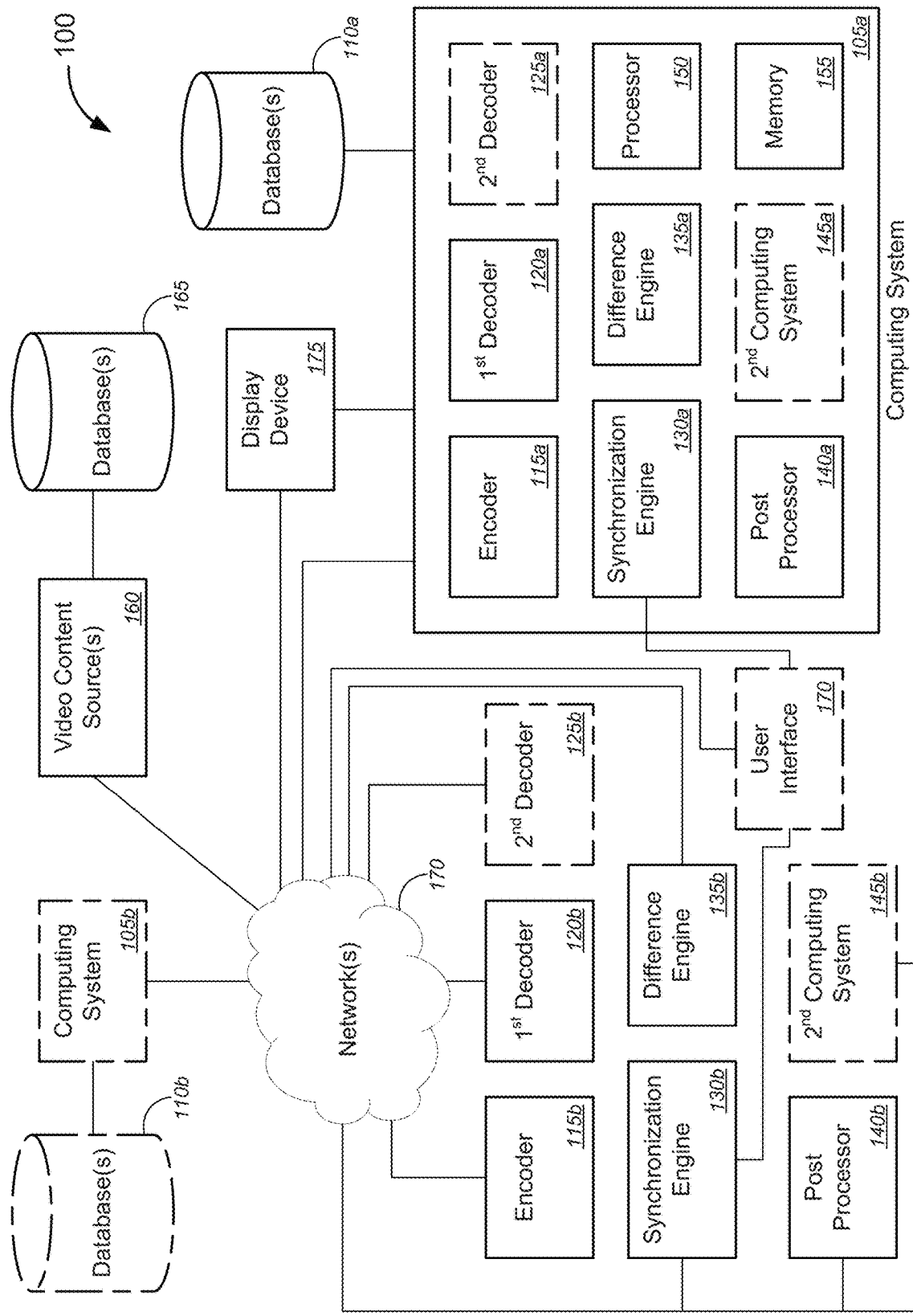
FIG. 1 is a schematic diagram illustrating a system for implementing detection and visual enhancement of video encoding artifacts, in accordance with various embodiments.

Various embodiments provide tools and techniques for implementing video encoding and decoding, and, more particularly, to methods, systems, and apparatuses for implementing detection and visual enhancement of video encoding artifacts.

In various embodiments, an encoder might encode, using one or more encoding algorithms that are under test, an original video signal that is received from a video content source(s) (and/or corresponding database(s)), in some cases, via a network(s). The encoder might send an encoded video signal to a first decoder, which might decode the encoded video signal. A synchronization system or engine might receive the original video signal from the video content source(s) (and/or corresponding database(s)) via the network(s); might receive the decoded video signal from the first decoder; and might implement frame synchronization of the received original video signal and the decoded video signal. A difference engine might generate a difference signal between the synchronized original video signal and the synchronized decoded video signal. Subsequently, a post processor might implement post processing of the generated difference signal to enhance video encoding artifacts.

According to some embodiments, at least two of the encoder, the decoder, the synchronization system, the difference engine, or the post processor, and/or the like might be integrated into a computing system. In some embodiments, a display device might display the difference signal (either post-processed or not). Alternatively, or additionally, a second computing system might adjust one or more parameters to modify the one or more encoding algorithms to minimize video encoding artifacts based at least in part on the enhanced video encoding artifacts revealed by the post processing of the generated difference signal, and/or might adjust some parameters to modify one or more encoding algorithms in the encoder (or might send the modified one or more encoding algorithms (or the adjusted one or more parameters of the encoding algorithms) to the encoder).

In this manner, video encoding artifacts can more easily be identified by the user or by the computing system, thereby ultimately resulting in development of improved encoding algorithms that minimize or even eliminate some (if not all) of these video encoding artifacts. In some embodiments, an iterative process of testing encoding algorithms, modifying such encoding algorithms, and retesting the modified encoding algorithms may be implemented as appropriate or as desired, until the video encoding artifacts are either eliminated or at least minimized to desired levels or amounts.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, video content streaming or downloading technology, video encoding and decoding technology and/or the like. In other aspects, certain embodiments, can improve the functioning of user equipment or systems themselves (e.g., video content streaming or downloading systems, video encoding and decoding systems, etc.), for example, by encoding, with an encoder, an original video signal received from a video source; decoding, with the decoder, the encoded video signal that is sent from the encoder; receiving, with a synchronization system, the original video signal from the video source; receiving, with the synchronization system, the decoded video signal from the decoder; implementing, with the synchronization system, frame synchronization of the received original video signal and the received decoded video signal; generating, with a difference engine, a difference signal between the synchronized original video signal and the synchronized decoded video signal; implementing, with a post processor, post processing of the generated difference signal to enhance video encoding artifacts; and modifying, with a second computing system, one or more parameters in one or more encoding algorithms to minimize video encoding artifacts based at least in part on the enhanced video encoding artifacts revealed by the post processing of the generated difference signal; and/or the like. In particular, to the extent any abstract concepts are present in the various embodiments, those concepts can be implemented as described herein by devices, software, systems, and methods that involve specific novel functionality (e.g., steps or operations), such as, encoding, with an encoder, an original video signal received from a video source; decoding, with the decoder, the encoded video signal that is sent from the encoder; receiving, with a synchronization system, the original video signal from the video source; receiving, with the synchronization system, the decoded video signal from the decoder; implementing, with the synchronization system, frame synchronization of the received original video signal and the received decoded video signal; generating, with a difference engine, a difference signal between the synchronized original video signal and the synchronized decoded video signal; implementing, with a post processor, post processing of the generated difference signal to enhance video encoding artifacts; and modifying, with a second computing system, one or more parameters in one or more encoding algorithms to minimize video encoding artifacts based at least in part on the enhanced video encoding artifacts revealed by the post processing of the generated difference signal; and/or the like, to name a few examples, that extend beyond mere conventional computer processing operations. These functionalities can produce tangible results outside of the implementing computer system, including, merely by way of example, video encoding artifacts that can more easily be identified by the user or by the computing system, thereby ultimately resulting in development of improved encoding algorithms that minimize or even eliminate some (if not all) of these video encoding artifacts, elimination or at least minimization of such video encoding artifacts, and/or the like, at least some of which may be observed or measured by customers and/or service providers.

In an aspect, a method might comprise encoding, with an encoder, an original video signal received from a video source; sending, with the encoder, an encoded video signal to a decoder; and decoding, with the decoder, the encoded video signal that is sent from the encoder. The method might also comprise receiving, with a synchronization system, the original video signal from the video source; receiving, with the synchronization system, the decoded video signal from the decoder; and implementing, with the synchronization system, frame synchronization of the received original video signal and the received decoded video signal. The method might further comprise generating, with a difference engine, a difference signal between the synchronized original video signal and the synchronized decoded video signal; and implementing, with a post processor, post processing of the generated difference signal to enhance video encoding artifacts.

In some embodiments, at least two of the encoder, the decoder, the synchronization system, the difference engine, or the post processor are integrated into a computing system. According to some embodiments, the original video signal is uncompressed. Alternatively, the original video signal is compressed. In such cases, the encoder is a video transcoder that transcodes the compressed original video signal, the decoder is a first reference decoder that decodes the transcoded compressed original video signal, and the method further comprises decoding, with a second reference decoder, the compressed original video signal, prior to being received by the synchronization system. The first reference decoder and the second reference decoder have identical hardware, software, and settings.

According to some embodiments, implementing frame synchronization of the received original video signal and the received decoded video signal might comprise implementing, with the synchronization system, frame synchronization of the received original video signal and the received decoded video signal by synchronizing timing signals embedded in the received original video signal and the received decoded video signal. In some cases, synchronizing timing signals embedded in the received original video signal and the received decoded video signal might comprise applying a time delay to one of the received original video signal or the received decoded video signal. In some instances, applying a time delay to one of the received original video signal or the received decoded video signal might comprise utilizing a circular buffer or the like.

Alternatively, implementing frame synchronization of the received original video signal and the received decoded video signal might comprise implementing, with the synchronization system, frame synchronization of the received original video signal and the received decoded video signal by providing a user with manual adjustment options for frame synchronization, receiving user selection of the manual adjustment options, and applying a time delay to one of the received original video signal or the received decoded video signal based on the received user selection of the manual adjustment options.

In yet another alternative embodiment, implementing frame synchronization of the received original video signal and the received decoded video signal might comprise implementing, with the synchronization system, frame synchronization of the received original video signal and the received decoded video signal by utilizing image recognition to match frames to predetermined threshold levels.

Merely by way of example, in some embodiments, post processing of the generated difference signal might comprise at least one of adjusting brightness levels, adjusting highlight levels, adjusting black levels, adjusting contrast levels, adjusting gamma curve, implementing edge detection, providing a user with zoom options, or providing the user with options to view the difference signal in unprocessed form, and/or the like. In some embodiments, the method might further comprise enabling the user to alternate or toggle the display of the video streams on the same monitor or display device (e.g., by using a suitable user interface and input method, such as keyboard, mouse, touchpad, and/or the like, to quickly switch back and forth between the two video streams). In some instances, the method might further comprise displaying the difference signal (either post-processed or not) on a display device.

According to some embodiments, the video encoding artifacts might comprise at least one of block effects, mosquito noise, salt and pepper noise, contouring effects, aliasing effects, or low pass filtering effects, and/or the like. In some cases, the method might further comprise modifying or adjusting, with a second computing system, one or more parameters in one or more encoding algorithms to minimize video encoding artifacts based at least in part on the enhanced video encoding artifacts revealed by the post processing of the generated difference signal. In some instances, the first computing system and the second computing system might be the same computing system. In some embodiments, the method might further comprise sending with the second computing system, the modified or adjusted one or more parameters of one or more encoding algorithms to the encoder.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: encode an original video signal received from a video source; decode the encoded video signal; receive the original video signal from the video source; implement frame synchronization of the received original video signal and the decoded video signal; generate a difference signal between the synchronized original video signal and the synchronized decoded video signal; and implement post processing of the generated difference signal to enhance video encoding artifacts.

In some embodiments, the original video signal is uncompressed. Alternatively, the original video signal is compressed. In such cases set of instructions, when executed by the at least one processor, further causes the apparatus to decode the compressed original video signal, prior to implementing frame synchronization.

According to some embodiments, implementing frame synchronization of the received original video signal and the decoded video signal might comprise synchronizing timing signals embedded in the received original video signal and the decoded video signal. In some cases, synchronizing timing signals embedded in the received original video signal and the decoded video signal might comprise applying a time delay to one of the received original video signal or the decoded video signal. In some instances, applying a time delay to one of the received original video signal or the decoded video signal might comprise utilizing a circular buffer or the like.

Alternatively, implementing frame synchronization of the received original video signal and the decoded video signal might comprise: providing a user with manual adjustment options for frame synchronization; receiving user selection of the manual adjustment options; and applying a time delay to one of the received original video signal or the decoded video signal based on the received user selection of the manual adjustment options.

In yet another alternative embodiment, implementing frame synchronization of the received original video signal and the decoded video signal might comprise implementing frame synchronization of the received original video signal and the decoded video signal by utilizing image recognition to match frames to predetermined threshold levels.

Merely by way of example, in some embodiments, post processing of the generated difference signal might comprise at least one of adjusting brightness levels, adjusting highlight levels, adjusting black levels, adjusting contrast levels, adjusting gamma curve, implementing edge detection, providing a user with zoom options, or providing the user with options to view the difference signal in unprocessed form, and/or the like. In some embodiments, potentially in combination with the methods described herein, the apparatus might enable the user to alternate or toggle the display of the video streams on the same monitor or display device (e.g., by using a suitable user interface and input method, such as keyboard, mouse, touchpad, and/or the like, to quickly switch back and forth between the two video streams). In some instances, the set of instructions, when executed by the at least one processor, further causes the apparatus to display the difference signal (either post-processed or not) on a display device.

According to some embodiments, the video encoding artifacts might comprise at least one of block effects, mosquito noise, salt and pepper noise, contouring effects, aliasing effects, or low pass filtering effects, and/or the like. In some cases, the set of instructions, when executed by the at least one processor, further causes the apparatus to modify or adjust one or more parameters in one or more encoding algorithms to minimize video encoding artifacts based at least in part on the enhanced video encoding artifacts revealed by the post processing of the generated difference signal. In some embodiments, the set of instructions, when executed by the at least one processor, further causes the apparatus to encode the original video signal using the modified one or more parameters in the one or more encoding algorithms.

In yet another aspect, a system might comprise an encoder, a decoder, a synchronization system, a difference engine, and a post processor. The encoder might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the encoder to: encode an original video signal received from a video source; and send an encoded video signal to a decoder.

The decoder might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the decoder to: receive the encoded video signal that is sent from the encoder; and decode the encoded video signal.

A synchronization system might comprise at least one third processor and a third non-transitory computer readable medium communicatively coupled to the at least one third processor. The third non-transitory computer readable medium might have stored thereon computer software comprising a third set of instructions that, when executed by the at least one third processor, causes the synchronization system to: receive the original video signal from the video source; receive the decoded video signal from the decoder; and implement frame synchronization of the received original video signal and the received decoded video signal.

A difference engine might comprise at least one fourth processor and a fourth non-transitory computer readable medium communicatively coupled to the at least one fourth processor. The fourth non-transitory computer readable medium might have stored thereon computer software comprising a fourth set of instructions that, when executed by the at least one fourth processor, causes the difference engine to: generate a difference signal between the synchronized original video signal and the synchronized decoded video signal.

A post processor might comprise at least one fifth processor and a fifth non-transitory computer readable medium communicatively coupled to the at least one fifth processor. The fifth non-transitory computer readable medium might have stored thereon computer software comprising a fifth set of instructions that, when executed by the at least one fifth processor, causes the post processor to: implement post processing of the generated difference signal to enhance video encoding artifacts.

In some embodiments, the system might further comprise a first computing system comprising at least two of the encoder, the decoder, the synchronization system, the difference engine, or the post processor, and/or the like. According to some embodiments, the original video signal is uncompressed. Alternatively, the original video signal is compressed. In such cases, the encoder is a video transcoder that transcodes the compressed original video signal, the decoder is a first reference decoder that decodes the transcoded compressed original video signal, and the system further comprises a second reference decoder.

The second reference decoder might comprise at least one sixth processor and a sixth non-transitory computer readable medium communicatively coupled to the at least one sixth processor. The sixth non-transitory computer readable medium might have stored thereon computer software comprising a sixth set of instructions that, when executed by the at least one sixth processor, causes the second reference decoder to: decode the compressed original video signal, prior to being received by the synchronization system. The first reference decoder and the second reference decoder have identical hardware, software, and settings.

According to some embodiments, post processing of the generated difference signal might comprise at least one of adjusting brightness levels, adjusting highlight levels, adjusting black levels, adjusting contrast levels, adjusting gamma curve, implementing edge detection, providing a user with zoom options, or providing the user with options to view the difference signal in unprocessed form, and/or the like. In some embodiments, potentially in combination with the methods described herein, the system might enable the user to alternate or toggle the display of the video streams on the same monitor or display device (e.g., by using a suitable user interface and input method, such as keyboard, mouse, touchpad, and/or the like, to quickly switch back and forth between the two video streams). In some instances, the system might further comprise a display device that displays the difference signal (either post-processed or not).

Merely by way of example, in some cases, the video encoding artifacts might comprise at least one of block effects, mosquito noise, salt and pepper noise, contouring effects, aliasing effects, or low pass filtering effects, and/or the like. The system might further comprise a second computing system. The second computing system might comprise at least one seventh processor and a seventh non-transitory computer readable medium communicatively coupled to the at least one seventh processor. The seventh non-transitory computer readable medium might have stored thereon computer software comprising a seventh set of instructions that, when executed by the at least one seventh processor, causes the second computing system to: modify or adjust one or more parameters in one or more encoding algorithms to minimize video encoding artifacts based at least in part on the enhanced video encoding artifacts revealed by the post processing of the generated difference signal. In some embodiments, the seventh set of instructions, when executed by the at least one seventh processor, might further cause the second computing system to: send the modified or adjusted one or more parameters of the one or more encoding algorithms to the encoder.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing video encoding and decoding, and, more particularly, to methods, systems, and apparatuses for implementing detection and visual enhancement of video encoding artifacts, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing detection and visual enhancement of video encoding artifacts, in accordance with various embodiments. In the non-limiting example of FIG. 1, system 100 might comprise a computing system 105a and a corresponding database(s) 110a with which computing system 105a might be communicatively coupled. Although database(s) 110a is shown to be external to computing system 105a, the various embodiments are not so limited and database(s) 110a might be disposed within computing system 105a. In some embodiments, computing system 105a might include, without limitation, two or more of an encoder 115a, a first decoder 120a, a second decoder 125a (optional), a synchronization engine 130a, a difference engine 135a, a post processor 140a, and a second computing system 145a (optional), and/or the like. In some cases, computing system 105a might further comprise processor 150 and memory 155.

In alternative embodiments, one or more of the components of computing system 105a might be embodied as separate components that may each be in communication with one or more other components. For instance, system 100 might include, but is not limited to, an encoder 115b, a first decoder 120b, a second decoder 125b (optional), a synchronization engine 130b, a difference engine 135b, a post processor 140b, and a second computing system 145b (optional), and/or the like, each of which might be stand-alone or separate components.

System 100 might further comprise one or more video content sources 160, each of which is communicatively coupled to corresponding database(s) 165. The one or more video content sources 160 are communicatively coupled to computing system 105a (or at least encoder 115a and synchronization engine 130a of computing system 105a), at least encoder 115b and synchronization engine 130b, etc., via network(s) 170 (through wireless and/or wired communications).

According to some embodiments, system 100 might further comprise user interface device or user device 170 (optional) and display device 175. Although computing system 105a is shown to be local with respect to each of the user interface device or user device 170 (optional) and the display device 175, the various embodiments are not so limited and computing system may be remotely located. For instance, system 100 might comprise computing system 105b and corresponding database 110b (which is communicatively coupled to, or disposed within, computing system 105b), the computing system 105b being communicatively coupled to user interface 170 (optional) and/or display device 175 via network(s) 170.

In operation, the computing system 105a or 105b, or the encoder 115a or 115b), might encode an original video signal that is received from at least one of the one or more video content sources 160 (and/or corresponding database(s) 165) via network(s) 170, using one or more encoding algorithms that are under test. The encoder 115a or 115b might send an encoded video signal to the first decoder 120a or 120b, which might decode the encoded video signal, while the computing system 105a or 105b might either internally transfer the encoded video signal to decoding processes or decode accordingly. The computing system 105a or 105b, or the synchronization system or engine 130a or 130b, might receive the original video signal from the at least one of the one or more video content sources 160 (and/or corresponding database(s) 165) via network(s) 170; might receive the decoded video signal from the first decoder 120a or 120b (if applicable); and might implement frame synchronization of the received original video signal and the (received) decoded video signal. The computing system 105a or 105b), or the difference engine 135a or 135b, might generate a difference signal between the synchronized original video signal and the synchronized decoded video signal. Subsequently, the computing system 105a or 105b, or the post processor 140a or 140b, might implement post processing of the generated difference signal to enhance video encoding artifacts. In the case that the computing system 105a or 105b as a single functional block (rather than modular units such as encoder 115a, first decoder 120a, synchronization engine 130a, difference engine 135a, post processor 140a, and so on) performs these processes, the processor 150 might execute computer software that is stored in memory 155 to cause the computing system 105a or 105b to perform these processes. In some embodiments, one or more of these processes might be performed in real-time or near-real-time.

Figure 2:
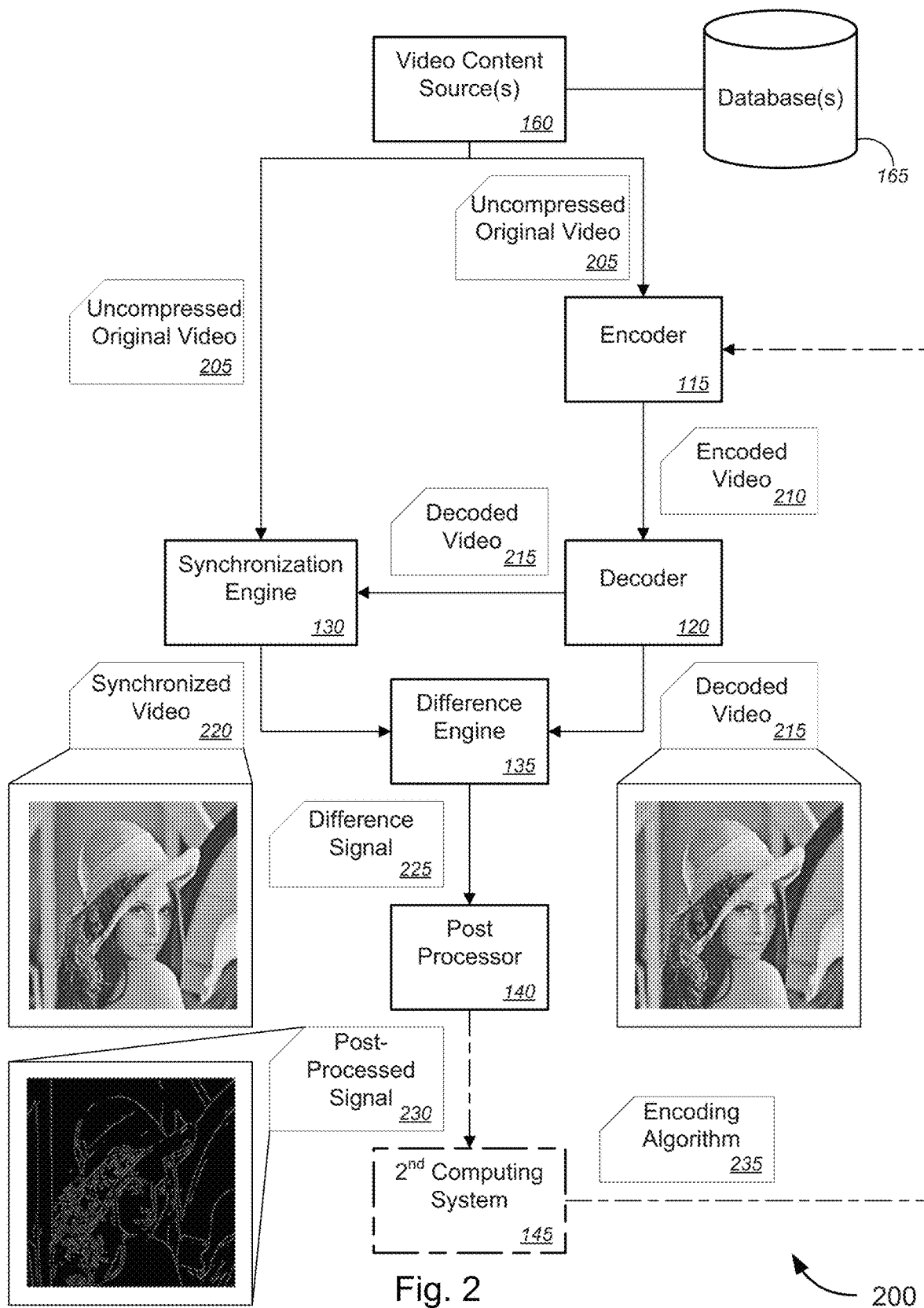
FIG. 2 is a system flow diagram illustrating a system for implementing detection and visual enhancement of video encoding artifacts in which the original video signal is available in uncompressed form, in accordance with various embodiments.

According to some embodiments, the original video signal is uncompressed, and the testing of the encoders 115a or 115b or the testing of the encoding algorithms follow the processes as shown in system 200 of FIG. 2. Alternatively, the original video signal is compressed. In such cases, the encoder is a video transcoder that transcodes the compressed original video signal, the decoder is a first reference decoder that decodes the transcoded compressed original video signal, and the testing of the transcoders 115a or 115b or the testing of the transcoding algorithms follow the processes as shown in system 300 of FIG. 3. Further with respect to such cases, the computing system 105a or 105b, or the second decoder or second reference decoder 125a or 125b, might decode the compressed original video signal, prior to frame synchronization. The first reference decoder 120a or 120b and the second reference decoder 125a or 125b have identical hardware and software, and are configured using identical settings.

In some embodiments, implementing frame synchronization of the received original video signal and the (received) decoded video signal might comprise implementing frame synchronization of the received original video signal and the (received) decoded video signal by synchronizing timing signals embedded in the received original video signal and the (received) decoded video signal. In some cases, synchronizing timing signals embedded in the received original video signal and the (received) decoded video signal might comprise applying a time delay to one of the received original video signal or the (received) decoded video signal. In some instances, applying a time delay to one of the received original video signal or the (received) decoded video signal might comprise utilizing a circular buffer (using either RAM, solid state storage, or disk space, etc.), or the like. According to some embodiments, frame synchronization might be implemented as described in greater detail in the '185 application, which claims priority to '249 Application (and which has already been incorporated herein by reference in its entirety for all purposes).

Alternatively, implementing frame synchronization of the received original video signal and the (received) decoded video signal might comprise implementing frame synchronization of the received original video signal and the (received) decoded video signal by providing a user, via the user interface or user device 170, with manual adjustment options for frame synchronization, receiving user selection of the manual adjustment options, and applying a time delay to one of the received original video signal or the (received) decoded video signal based on the received user selection of the manual adjustment options.

In yet another alternative embodiment, implementing frame synchronization of the received original video signal and the (received) decoded video signal might comprise implementing, with the synchronization system, frame synchronization of the received original video signal and the (received) decoded video signal by utilizing image recognition to match frames to predetermined threshold levels. In other words, because the encoded/decoded video signal is expected to contain some video encoding artifacts, the corresponding frames would not match exactly. Rather, certain aspects or at least a certain percentage of the corresponding frames would match. Thus, the predetermined threshold levels might include a predetermined percentage of match or a predetermined setting for matching characteristics of the corresponding frames (regardless of percentage of match), or the likes.

Merely by way of example, in some embodiments, post processing of the generated difference signal might comprise at least one of adjusting brightness levels, adjusting highlight levels, adjusting black levels, adjusting contrast levels, adjusting gamma curve, implementing edge detection, providing a user with zoom options, or providing the user with options to view the difference signal in unprocessed form, and/or the like. In some embodiments, potentially in combination with the methods described herein, the system might enable the user to alternate or toggle the display of the video streams on the same monitor or display device (e.g., by using a suitable user interface and input method, such as keyboard, mouse, touchpad, and/or the like, to quickly switch back and forth between the two video streams). In some instances, the computing system 105a or 105b might display, on the display device 175, the difference signal (either post-processed or not).

According to some embodiments, the video encoding artifacts might comprise at least one of block effects, mosquito noise, salt and pepper noise, contouring effects, aliasing effects, or low pass filtering effects, and/or the like. In some cases, the computing system 105a or 105b, or the second computing system 145a or 145b, might modify or adjust one or more parameters in the one or more encoding algorithms to minimize video encoding artifacts based at least in part on the enhanced video encoding artifacts revealed by the post processing of the generated difference signal. In some embodiments, the second computing system 145a or 145b, might send the modified one or more parameters of the one or more encoding algorithms to the encoder 115a or 115b. The computing system 105a or 105b, serving as a single functional block, might utilize the modified one or more parameters of the one or more encoding algorithms (or the modified one or more encoding algorithms, in general) to encode or transcode subsequent received original video signals. Database(s) 110a or 110b might store at least one of the one or more encoding algorithms, the modified one or more encoding algorithms, the modified one or more parameters of the one or more encoding algorithms, the difference signals, the post processed signals, and/or the like.

In this manner, video encoding artifacts can more easily be identified by the user or by the computing system, thereby ultimately resulting in development of improved encoding algorithms that minimize or even eliminate some (if not all) of these video encoding artifacts. In some embodiments, an iterative process of testing encoding algorithms, modifying such encoding algorithms (and/or the parameters of the encoding algorithms), and retesting the modified encoding algorithms may be implemented as appropriate or as desired, until the video encoding artifacts are either eliminated or at least minimized to desired levels or amounts.

FIG. 2 is a system flow diagram illustrating a system 200 for implementing detection and visual enhancement of video encoding artifacts in which the original video signal is available in uncompressed form, in accordance with various embodiments.

In the non-limiting example of FIG. 2, system 200 might comprise retrieving, with an encoder 115, an uncompressed original video signal 205 from one or more video content sources 160 (in some cases, from a database(s) 165 in communication with the one or more video content sources 160). The encoder 115 might encode the uncompressed original video signal 205 using one or more encoding algorithms, and might send the encoded video signal 210 to a decoder 120. The decoder 120 might decode the encoded video signal 210 that is sent from the encoder 115. A synchronization engine 130 might receive the original video signal 205 from the one or more video content sources 160, the original video signal 205 being the same as the original video signal 205 that is retrieved by the encoder 115. The synchronization engine 130 might also receive the decoded video signal 215 from the decoder 120, and might implement frame synchronization of the received original video signal 205 and the received decoded video signal 215 based at least in part on the received decoded video signal 215.

In some embodiments, implementing frame synchronization of the received original video signal 205 and the received decoded video signal 215 might comprise implementing, with the synchronization engine 130, frame synchronization of the received original video signal 205 and the received decoded video signal 215 by synchronizing timing signals embedded in the received original video signal 205 and the received decoded video signal 215 (which may have been originally embedded within uncompressed original video signal 205). In some cases, synchronizing timing signals embedded in the received original video signal 205 and the received decoded video signal 215 might comprise applying a time delay to one of the received original video signal 205 or the received decoded video signal 215. In a number of embodiments, the time delay is applied to the received original video signal 205 based at least in part on the received decoded video signal 215. In some instances, applying a time delay to one of the received original video signal 205 or the received decoded video signal 215 might comprise utilizing a circular buffer (not shown), or the like. The amount of time delay would correspond to the latency through the encoder 115 and the decoder 120.

Alternatively, implementing frame synchronization of the received original video signal 205 and the received decoded video signal 215 might comprise implementing, with the synchronization engine 130, frame synchronization of the received original video signal 205 and the received decoded video signal 215 by providing a user with manual adjustment options for frame synchronization—e.g., via user interface or user device 170 of system 100 of FIG. 1, or the like—, receiving user selection of the manual adjustment options, and applying a time delay to one of the received original video signal 205 or the received decoded video signal 215 based on the received user selection of the manual adjustment options. In a number of embodiments, the time delay is applied to the received original video signal 205 based on the received user selection of the manual adjustment options. In some instances, applying a time delay to one of the received original video signal 205 or the received decoded video signal 215 might comprise utilizing a circular buffer (not shown), or the like. The amount of time delay would correspond to the latency through the encoder 115 and the decoder 120.

In yet another alternative embodiment, implementing frame synchronization of the received original video signal 205 and the received decoded video signal 215 might comprise implementing, with the synchronization engine 130, frame synchronization of the received original video signal 205 and the received decoded video signal 215 by utilizing image recognition to match frames to predetermined threshold levels. In other words, because the encoded/decoded video signal is expected to contain some video encoding artifacts, the corresponding frames would not match exactly. Rather, certain aspects or at least a certain percentage of the corresponding frames would match. Thus, the predetermined threshold levels might include a predetermined percentage of match or a predetermined setting for matching characteristics of the corresponding frames (regardless of percentage of match), or the likes.

System 200 might further comprise generating, with a difference engine 135, a difference signal 225 between the synchronized original video signal 220 and the (synchronized) decoded video signal 215. As shown in FIG. 2, the frame of the synchronized original video signal 220 has no encoding artifacts, while the corresponding frame of the (synchronized) decoded video signal 215 has some encoding artifacts. The post processor 140 might implement post processing of the generated difference signal 225 to enhance video encoding artifacts, e.g., as shown in post-processed signal 230, which shows only the newly introduced encoding artifacts. In some embodiments, post processing of the generated difference signal might include, but is not limited to, at least one of adjusting brightness levels, adjusting highlight levels, adjusting black levels, adjusting contrast levels, adjusting gamma curve, implementing edge detection, providing a user with zoom options, or providing the user with options to view the difference signal in unprocessed form, and/or the like. In some embodiments, potentially in combination with the methods described herein, the system 200 might enable the user to alternate or toggle the display of the video streams on the same monitor or display device (e.g., by using a suitable user interface and input method, such as keyboard, mouse, touchpad, and/or the like, to quickly switch back and forth between the two video streams). According to some embodiments, the video encoding artifacts might include, without limitation, at least one of block effects, mosquito noise, salt and pepper noise, contouring effects, aliasing effects, or low pass filtering effects, and/or the like.

Merely by way of example, in some embodiments, a second computing system 145 (optional) might modify or adjust one or more parameters in the one or more encoding algorithms to minimize video encoding artifacts based at least in part on the enhanced video encoding artifacts revealed by the post processing of the generated difference signal (i.e., as shown, or as highlighted or emphasized, in the post-processed signal 230). The resultant modified encoding algorithms (and/or the modified one or more parameters of the encoding algorithms) may subsequently be sent to the encoder 115 for future encoding and/or testing.

According to some embodiments, at least two of the encoder 115, the decoder 120, the synchronization system 130, the difference engine 135, or the post processor 140 might be integrated within a single functional block or a single computing system (such as shown in FIG. 1 with respect to computing system 105a, which is shown to integrate all of these components, or the like, although not limited to the particular embodiment of computing system 105a of FIG. 1).

The encoder 115, the decoder 120, the synchronization engine 130, the difference engine 135, the post processor 140, the second computing system 145, the one or more video content sources 160, and the database(s) 165 of system 200 of FIG. 2 might otherwise be similar, if not identical, to the encoder 115a or 115b, the first decoder 120a or 120b, the synchronization engine 130a or 130b, the difference engine 135a or 135b, the post processor 140a or 140b, the second computing system 145a or 145b, the one or more video content sources 160, and the database(s) 165 of system 100 of FIG. 1, respectively. Accordingly, the descriptions of these components of system 100 of FIG. 1 are similarly applicable to the corresponding components in FIG. 2.

Figure 3:
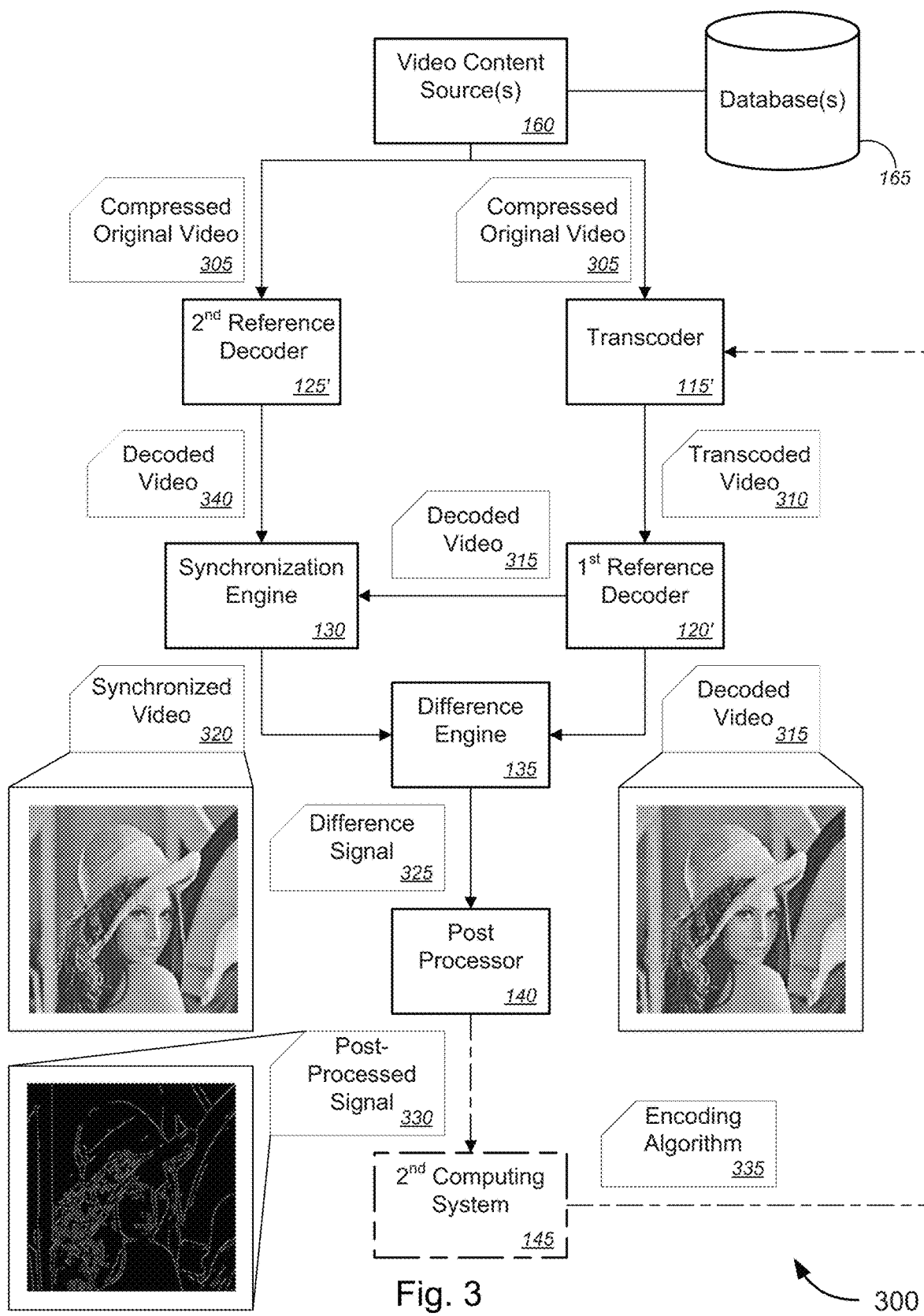
FIG. 3 is a system flow diagram illustrating a system for implementing detection and visual enhancement of video encoding artifacts in which the original video signal is available only in compressed form, in accordance with various embodiments.

FIG. 3 is a system flow diagram illustrating a system 300 for implementing detection and visual enhancement of video encoding artifacts in which the original video signal is available only in compressed form, in accordance with various embodiments.

In the non-limiting example of FIG. 3, system 300 might comprise retrieving, with a transcoder 115', a compressed original video signal 305 from one or more video content sources 160 (in some cases, from a database(s) 165 in communication with the one or more video content sources 160). The transcoder 115' might encode or transcode the compressed original video signal 305 using one or more encoding algorithms, and might send the transcoded video signal 310 to a first reference decoder 120'. The first reference decoder 120' might decode the transcoded video signal 310 that is sent from the transcoder 115'. A second reference decoder 125' might receive the original video signal 305 from the one or more video content sources 160, the original video signal 305 being the same as the original video signal 305 that is retrieved by the transcoder 115'. The first reference decoder 120' and the second reference decoder 125' might have identical hardware, software, and settings. A synchronization engine 130 might receive the decoded video signal 315 from the first reference decoder 120', might receive the decoded video signal 340 from the second reference decoder 125', and might implement frame synchronization of the received decoded video signal 340 and the received decoded video signal 315 based at least in part on the received decoded video signal 315.

In some embodiments, implementing frame synchronization of the received decoded video signal 340 and the received decoded video signal 315 might comprise implementing, with the synchronization engine 130, frame synchronization of the received decoded video signal 340 and the received decoded video signal 315 by synchronizing timing signals embedded in the received decoded video signal 340 and the received decoded video signal 315 (which may have been originally embedded within the compressed original video signal 305 or the unavailable uncompressed original video signal 305). In some cases, synchronizing timing signals embedded in the received decoded video signal 340 and the received decoded video signal 315 might comprise applying a time delay to one of the received decoded video signal 340 or the received decoded video signal 315. In a number of embodiments, the time delay is applied to the received decoded video signal 340 based at least in part on the received decoded video signal 315. In some instances, applying a time delay to one of the received decoded video signal 340 or the received decoded video signal 315 might comprise utilizing a circular buffer (not shown), or the like. The amount of time delay would correspond to the latency through the transcoder 115'.

Alternatively, implementing frame synchronization of the received decoded video signal 340 and the received decoded video signal 315 might comprise implementing, with the synchronization engine 130, frame synchronization of the received decoded video signal 340 and the received decoded video signal 315 by providing a user with manual adjustment options for frame synchronization—e.g., via user interface or user device 170 of system 100 of FIG. 1, or the like—, receiving user selection of the manual adjustment options, and applying a time delay to one of the received decoded video signal 340 or the received decoded video signal 315 based on the received user selection of the manual adjustment options. In a number of embodiments, the time delay is applied to the received decoded video signal 340 based on the received user selection of the manual adjustment options. In some instances, applying a time delay to one of the received decoded video signal 340 or the received decoded video signal 315 might comprise utilizing a circular buffer (not shown), or the like. The amount of time delay would correspond to the latency through the transcoder 115'.

In yet another alternative embodiment, implementing frame synchronization of the received decoded video signal 340 and the received decoded video signal 315 might comprise implementing, with the synchronization engine 130, frame synchronization of the received decoded video signal 340 and the received decoded video signal 315 by utilizing image recognition to match frames to predetermined threshold levels. In other words, because the encoded/decoded video signal is expected to contain some video encoding artifacts, the corresponding frames would not match exactly. Rather, certain aspects or at least a certain percentage of the corresponding frames would match. Thus, the predetermined threshold levels might include a predetermined percentage of match or a predetermined setting for matching characteristics of the corresponding frames (regardless of percentage of match), or the likes.

System 300 might further comprise generating, with a difference engine 135, a difference signal 325 between the synchronized video signal 320 and the (synchronized) decoded video signal 315. As shown in FIG. 3, the frame of the synchronized video signal 320 has no new encoding artifacts (only the artifacts caused by compression of the original video signal), while the corresponding frame of the (synchronized) decoded video signal 315 has some newly introduced encoding artifacts. The post processor 140 might implement post processing of the generated difference signal 325 to enhance the newly introduced video encoding artifacts, e.g., as shown in post-processed signal 330, which shows only the newly introduced encoding artifacts. In some embodiments, post processing of the generated difference signal might include, but is not limited to, at least one of adjusting brightness levels, adjusting highlight levels, adjusting black levels, adjusting contrast levels, adjusting gamma curve, implementing edge detection, providing a user with zoom options, or providing the user with options to view the difference signal in unprocessed form, and/or the like. In some embodiments, potentially in combination with the methods described herein, the system 300 might enable the user to alternate or toggle the display of the video streams on the same monitor or display device (e.g., by using a suitable user interface and input method, such as keyboard, mouse, touchpad, and/or the like, to quickly switch back and forth between the two video streams). According to some embodiments, the video encoding artifacts might include, without limitation, at least one of block effects, mosquito noise, salt and pepper noise, contouring effects, aliasing effects, or low pass filtering effects, and/or the like.

Merely by way of example, in some embodiments, a second computing system 145 (optional) might modify or adjust one or more parameters in the one or more encoding algorithms to minimize video encoding artifacts based at least in part on the enhanced newly introduced video encoding artifacts revealed by the post processing of the generated difference signal (i.e., as shown, or as highlighted or emphasized, in the post-processed signal 330). The resultant modified encoding algorithms (and/or the modified one or more parameters of the encoding algorithms) may subsequently be sent to the transcoder 115' for future encoding, transcoding, and/or testing.

According to some embodiments, at least two of the transcoder 115', the first reference decoder 120', the second reference decoder 125', the synchronization system 130, the difference engine 135, or the post processor 140 might be integrated within a single functional block or a single computing system (such as shown in FIG. 1 with respect to computing system 105*a*, which is shown to integrate all of these components, or the like, although not limited to the particular embodiment of computing system 105*a* of FIG. 1).

The transcoder 115', the first reference decoder 120', the second reference decoder 125', the synchronization engine 130, the difference engine 135, the post processor 140, the second computing system 145, the one or more video content sources 160, and the database(s) 165 of system 300 of FIG. 3 might otherwise be similar, if not identical, to the encoder 115*a* or 115*b*, the first decoder 120*a* or 120*b*, the second decoder 125*a* or 125*b*, the synchronization engine 130*a* or 130*b*, the difference engine 135*a* or 135*b*, the post processor 140*a* or 140*b*, the second computing system 145*a* or 145*b*, the one or more video content sources 160, and the database(s) 165 of system 100 of FIG. 1, respectively. Accordingly, the descriptions of these components of system 100 of FIG. 1 are similarly applicable to the corresponding components in FIG. 2.

Figure 4:
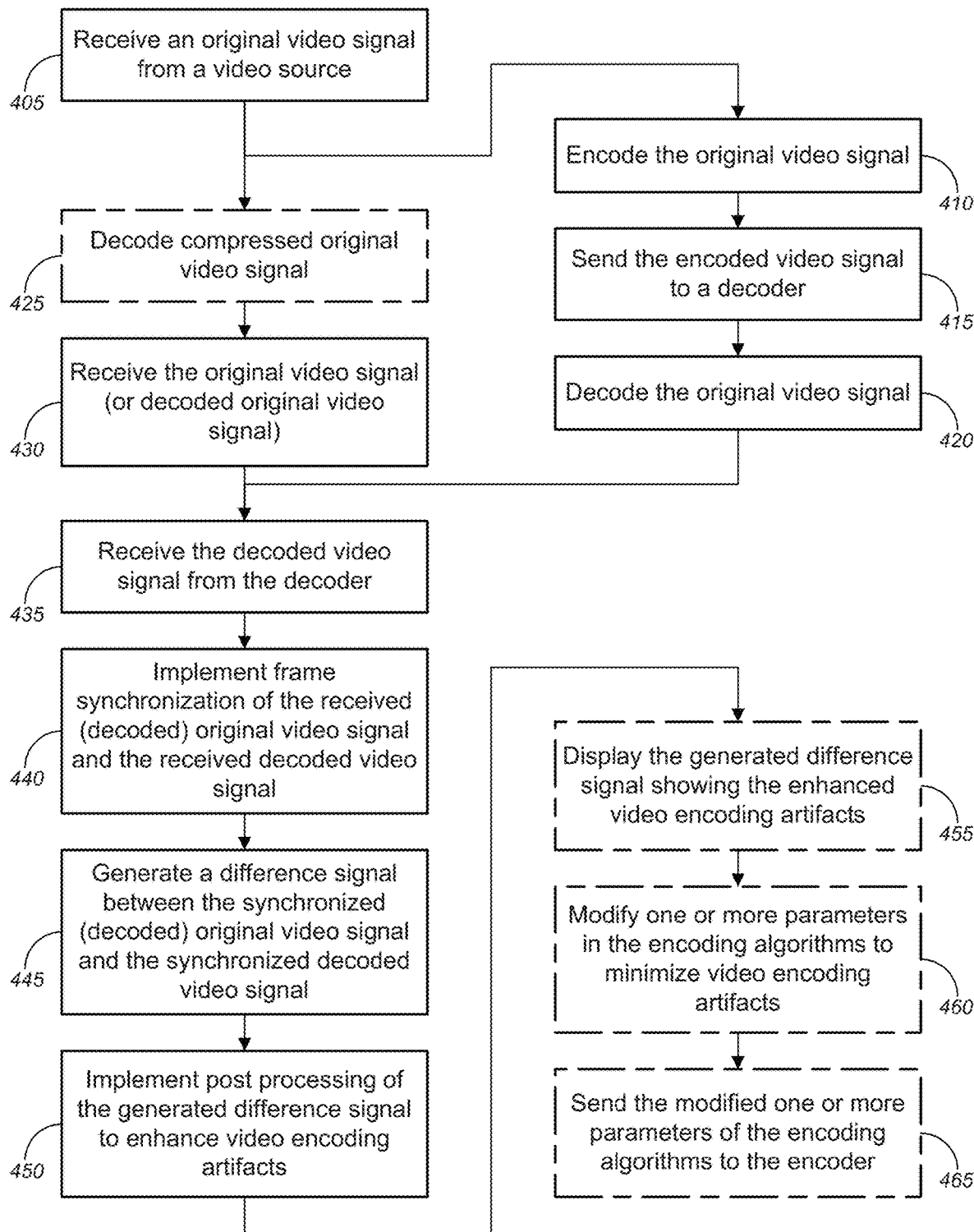
FIG. 4 is a flow diagram illustrating a method for implementing detection and visual enhancement of video encoding artifacts, in accordance with various embodiments.

FIG. 4 is a flow diagram illustrating a method 400 for implementing detection and visual enhancement of video encoding artifacts, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems 100, 200, and 300 of FIGS. 1, 2, and 3, respectively (or components thereof), such methods may also be implemented using any suitable hardware (or software) implementation. Similarly, while each of the systems 100, 200, and 300 of FIGS. 1, 2, and 3, respectively (or components thereof), can operate according to the method 400 illustrated by FIG. 4 (e.g., by executing instructions embodied on a computer readable medium), the systems 100, 200, and 300 of FIGS. 1, 2, and 3 can each also operate according to other modes of operation and/or perform other suitable procedures.

In the non-limiting embodiment of FIG. 4, method 400, at block 405, receiving an original video signal from a video source. The original video signal may be either an uncompressed original video signal such as uncompressed original video signal 205 of FIG. 2 or a compressed original video signal such as compressed original video signal 305 of FIG. 3, or the like. The original video signal may be received by a computing system (e.g., computing system 105*a* or 105*b* of FIG. 1, or the like) or by an encoder or transcoder (e.g., encoder 115*a* or 115*b* of FIG. 1, or the like). The video source might correspond to the one or more video content sources 160 and/or corresponding database(s) 165 of FIG. 1, or the like.

Method 400 might further comprise encoding, with the encoder, the original video signal received from the video source (block 410); sending, with the encoder, an encoded video signal to a decoder (block 415); and decoding, with the decoder (Which might correspond to the first decoder 120*a* or 120*b* of FIG. 1, or the like), the encoded video signal that is sent from the encoder (block 420). In the case that the original video signal is only available in compressed form, the encoder might be a video transcoder that transcodes the compressed original video signal (at block 410) and that sends the transcoded video signal to the decoder (at block 415), and the decoder might be a first reference decoder that decodes the transcoded compressed original video signal (at block 420).

While the original video signal is being encoded, sent, and decoded (at blocks 410-420), the method 400 might comprise decoding, with a second reference decoder, the compressed original video signal (block 425; optional, in the case that the original video signal is only available in compressed form). At block 430, method 400 might comprise receiving, with a synchronization system (which might correspond to synchronization system 130*a* or 130*b* of FIG. 1, or the like), the original video signal—which might be received from the video source if the uncompressed form is available, or might be received from the second reference decoder if the uncompressed form is unavailable and only the compressed form is available. Method 400, at block 435, might comprise receiving, with the synchronization system, the decoded video signal from the decoder first reference decoder).

Method 400 might further comprise implementing, with the synchronization system, frame synchronization of the received original video signal (or received decoded compressed original signal) and the received decoded video signal (from the decoder or first reference decoder) (block 440). As described in detail above with respect to FIGS. 1-3, implementing frame synchronization might include, without limitation, at least one of synchronizing timing signals embedded in the received original video signal (or received decoded compressed original signal) and the received decoded video signal; applying a time delay to one of the received original video signal (or received decoded compressed original signal) or the received decoded video signal some cases, by utilizing a circular buffer, or the like); providing a user with manual adjustment options for frame synchronization, receiving user selection of the manual adjustment options, and applying a time delay to one of the received original video signal (or received decoded compressed original signal) or the received decoded video signal based on the received user selection of the manual adjustment options; utilizing image recognition to match frames to predetermined threshold levels; and/or the like.

At block 445, method 400 might comprise generating, with a difference engine (which might correspond to difference engine 135*a* or 135*b* of FIG. 1, or the like), a difference signal between the synchronized original video signal (or synchronized decoded compressed original signal) and the synchronized decoded video signal. Method 400 might further comprise, at block 450, implementing, with a post processor, post processing of the generated difference signal to enhance video encoding artifacts. In some embodiments, post processing of the generated difference signal might include, but is not limited to, at least one of adjusting brightness levels, adjusting highlight levels, adjusting black levels, adjusting contrast levels, adjusting gamma curve, implementing edge detection, providing a user with zoom options, or providing the user with options to view the difference signal in unprocessed form, and/or the like. In some embodiments, method 400 might further comprise enabling the user to alternate or toggle the display of the video streams on the same monitor or display device (e.g., by using a suitable user interface and input method, such as keyboard, mouse, touchpad, and/or the like, to quickly switch back and forth between the two video streams) (not shown in FIG. 4). According to some embodiments, the video encoding artifacts might include, without limitation, at least one of block effects, mosquito noise, salt and pepper noise, contouring effects, aliasing effects, or low pass filtering effects, and/or the like.

Merely by way of example, in some aspects, method 400, at optional block 455, might comprise displaying the generated difference signal showing the enhanced video encoding artifacts, thereby aiding the user in identifying and/or perhaps developing improved encoding algorithms to minimize such video encoding artifacts. Alternatively or additionally, method 400 might further comprise adjusting or modifying, with a second computing system (which might correspond to second computing system 145a or 145b of FIG. 1, or the like), one or more parameters in the encoding algorithms to minimize video encoding artifacts, in some cases, based at least in part on the enhanced video encoding artifacts revealed by the post processing of the generated difference signal (block 460; optional) and sending the modified one or more parameters of the encoding algorithms (and/or the modified encoding algorithms) to the encoder or transcoder (block 465; optional). In this manner, video encoding artifacts can more easily be identified by the user or by the computing system, thereby ultimately resulting in development of improved encoding algorithms that minimize or even eliminate some (if not all) of these video encoding artifacts. In some embodiments, an iterative process of testing encoding algorithms, modifying such encoding algorithms (and/or parameters of the encoding algorithms), and retesting the modified encoding algorithms may be implemented as appropriate or as desired, until the video encoding artifacts are either eliminated or at least minimized to desired levels or amounts.

Exemplary System and Hardware Implementation

Figure 5:
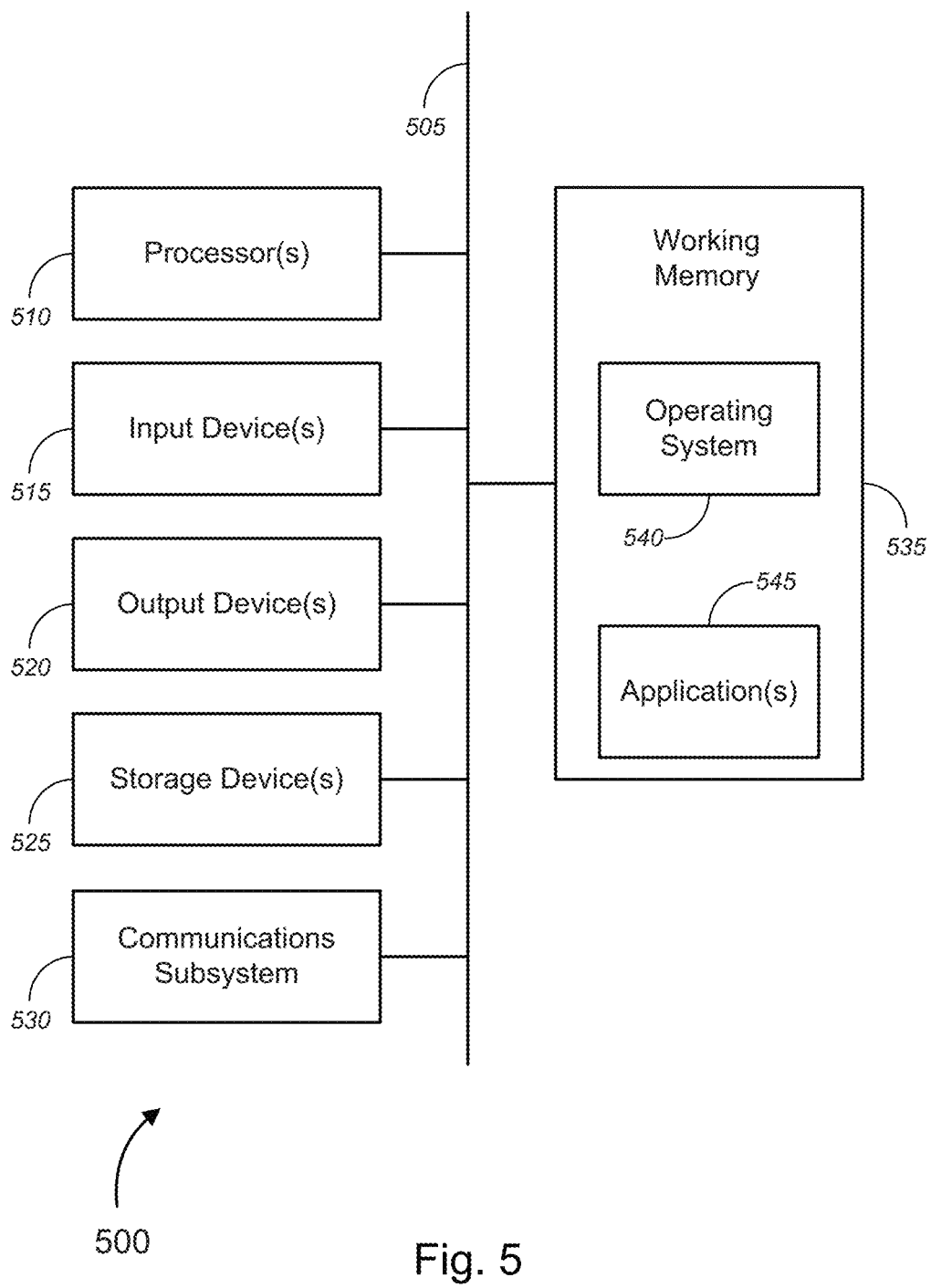
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 105a and 105b, second computing systems 145a, 145b, and 145, encoders 115a, 115b, and 115, transcoder 115', first decoders 120a, 120b, and 120, first reference decoder 120', second decoders 125a and 125b, second reference decoder 125', synchronization engines 130a, 130b, and 130, difference engines 135a, 135b, and 135, post processors 140a, 140b, and 140, user interface 170, display device 175, video content sources (or servers) 160, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500 which might represent an embodiment of the computer or hardware system (i.e., computing systems 105a and 105b, second computing systems 145a, 145b, and 145, encoders 115a, 115b, and 115, transcoder 115', first decoders 120a, 120b, and 120, first reference decoder 120', second decoders 125a and 125b, second reference decoder 125', synchronization engines 130a, 130b, and 130, difference engines 135a, 135b, and 135, post processors 140a, 140b, and 140, user interface 170, display device 175, video content sources (or servers) 160, etc.), described above with respect to FIGS. 1-4 is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
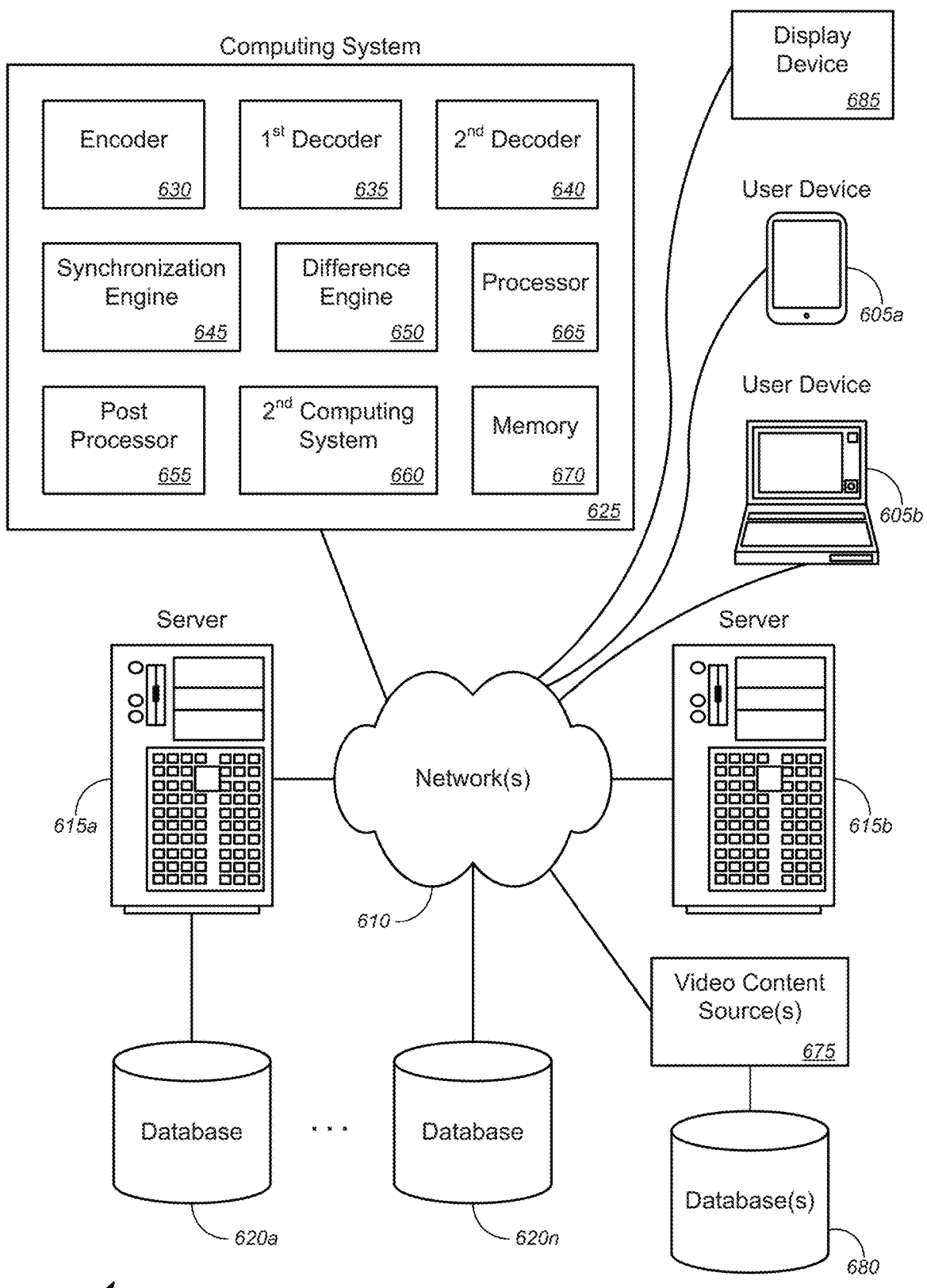
FIG. 6 is a block diagram illustrating a networked system of computers, computing systems, or system hardware architecture, which can be used in accordance with various embodiments.

As noted above, a set of embodiments comprises methods and systems for implementing video encoding and decoding, and, more particularly, to methods, systems, and apparatuses for implementing detection and visual enhancement of video encoding artifacts. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 170 FIG. 1, or the like) can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing video encoding and decoding, and, more particularly, to methods, systems, and apparatuses for implementing detection and visual enhancement of video encoding artifacts, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620*a*-620*n* (collectively, "databases 620"). The location of each of the databases 620 is discretionary: merely by way of example, a database 620*a* might reside on a storage medium local to (and/or resident in) a server 615*a* (and/or a user computer, user device, or customer device 605). Alternatively, a database 620*n* can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to computing systems 105*a* and 105*b* of FIG. 1, or the like), an encoder 630 (similar to encoders 115*a*, 115*b*, and 115 of FIGS. 1 and 2, or transcoder 115' of FIG. 3, or the like), a first decoder 635 (similar to first decoders 120*a*, 120*b*, and 120 of FIGS. 1 and 2, or first reference decoder 120' of FIG. 3, or the like), a second decoder 640 (similar to second decoders 125*a* and 125*b* of FIG. 1, or second reference decoder 125' of FIG. 3, or the like), a synchronization engine 645 (similar to synchronization engines 130*a*, 130*b*, and 130 of FIGS. 1-3, or the like), a difference engine 650 (similar to difference engines 135a, 135b, and 135 of FIGS. 1-3, or the like), a post processor 655 (similar to post processors 140a, 140b, and 140 of FIGS. 1-3, or the like), a second computing system 660 (similar to second computing systems 145a, 145b, and 145 of FIGS. 1-3, or the like), a processor 665 (similar to processor 150 of FIG. 1, or the like), and memory 670 (similar to memory 155 of FIG. 1, or the like). System 600 might further comprise video content source(s) 675 (similar to the one or more video content sources 160 of FIGS. 1-3, or the like) and corresponding database(s) 680 (similar to database(s) 165 of FIGS. 1-3, or the like). System 600 might also comprise display device 685 (similar to display device 175 of FIG. 1, or the like). In some cases, user device 605a or 605b might correspond to user interface or user device 170 of FIG. 1, or the like, and database(s) 620 might correspond to database(s) 110a or 110b of FIG. 1, or the like.

In operation, the computing system 625 (or servers 615a or 615b), or the encoder 630, might encode an original video signal that is received from the video content source(s) 675 (and/or corresponding database(s) 680) via network(s) 610, using one or more encoding algorithms that are under test. The encoder 630 might send an encoded video signal to the first decoder 635, which might decode the encoded video signal, while the computing system 625 (or servers 615a or 615b) might either internally transfer the encoded video signal to decoding processes or decode accordingly. The computing system 625 (or servers 615a or 615b), or the synchronization system or engine 645, might receive the original video signal from the video content source(s) 675 (and/or corresponding database(s) 680) via network(s) 610; might receive the decoded video signal from the first decoder 635 (if applicable); and might implement frame synchronization of the received original video signal and the (received) decoded video signal. The computing system 625 (or servers 615a or 615b), or the difference engine 650, might generate a difference signal between the synchronized original video signal and the synchronized decoded video signal. Subsequently, the computing system 625 (or servers 615a or 615b), or the post processor 655, might implement post processing of the generated difference signal to enhance video encoding artifacts.

In some embodiments, the computing system 625 (or servers 615a or 615b) might display, on the display device 685, the difference signal (either post-processed or not). Alternatively, or additionally, computing system 625 (or servers 615a or 615b), or the second computing system 660, might modify the one or more encoding algorithms to minimize video encoding artifacts based at least in part on the enhanced video encoding artifacts revealed by the post processing of the generated difference signal, and/or might send the modified one or more encoding algorithms to the encoder 630. The computing system 625 (or servers 615a or 615b), serving as a single functional block, might utilize the modified one or more encoding algorithms to encode or transcode subsequent received original video signals.

In the case that the computing system 625 (or servers 615a or 615b) as a single functional block (rather than modular units such as encoder 630, first decoder 635, synchronization engine 645, difference engine 650, post processor 655, the second computing system 660, and so on) performs these processes, the processor 665 might execute computer software that is stored in memory 670 to cause the computing system 625 (or servers 615a or 615b) to perform these processes.

These and other functions of the system 600 (and its components) are described in greater detail above with respect to FIGS. 1-4.

While certain features and aspects have been described with respect to exemplary embodiments, one skilled in the art, will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    encoding, with an encoder, an original video signal received from a video source;
    sending, with the encoder, an encoded video signal to a decoder;
    decoding, with the decoder, the encoded video signal that is sent from the encoder;
    receiving, with a synchronization system, the original video signal from the video source;
    receiving, with the synchronization system, the decoded video signal from the decoder;
    synchronizing, with the synchronization system, one or more first frames of the received original video signal with one or more second frames of the received decoded video signal;
    in response to synchronizing the one or more first frames of the received original video signal with the one or more second frames of the received decoded video signal, generating, with a difference engine, a difference signal between the synchronized original video signal and the synchronized decoded video signal;
    implementing, with a post processor, post processing of the generated difference signal to enhance video encoding artifacts, wherein the post-processed generated difference signal shows video encoding artifacts introduced in the one or more second frames of the received decoded video signal; and displaying, with a display device, the generated difference signal showing the video encoding artifacts introduced in the one or more second frames of the received decoded video signal.

2. The method of claim 1, wherein at least two of the encoder, the decoder, the synchronization system, the difference engine, or the post processor are integrated into a computing system.

3. The method of claim 1, wherein the original video signal is uncompressed.

4. The method of claim 1, wherein the original video signal is compressed, wherein the encoder is a video transcoder that transcodes the compressed original video signal, wherein the decoder is a first reference decoder that decodes the transcoded compressed original video signal, wherein the method further comprises decoding, with a second reference decoder, the compressed original video signal, prior to being received by the synchronization system, wherein the first reference decoder and the second reference decoder have identical hardware, software, and settings.

5. The method of claim 1, wherein implementing frame synchronization of the received original video signal and the received decoded video signal comprises implementing, with the synchronization system, frame synchronization of the received original video signal and the received decoded video signal by synchronizing timing signals embedded in the received original video signal and the received decoded video signal.

6. The method of claim 5, wherein synchronizing timing signals embedded in the received original video signal and the received decoded video signal comprises applying a time delay to one of the received original video signal or the received decoded video signal.

7. The method of claim 6, wherein applying a time delay to one of the received original video signal or the received decoded video signal comprises utilizing a circular buffer.

8. The method of claim 1, wherein implementing frame synchronization of the received original video signal and the received decoded video signal comprises implementing, with the synchronization system, frame synchronization of the received original video signal and the received decoded video signal by providing a user with manual adjustment options for frame synchronization, receiving user selection of the manual adjustment options, and applying a time delay to one of the received original video signal or the received decoded video signal based on the received user selection of the manual adjustment options.

9. The method of claim 1, wherein implementing frame synchronization of the received original video signal and the received decoded video signal comprises implementing, with the synchronization system, frame synchronization of the received original video signal and the received decoded video signal by utilizing image recognition to match frames to predetermined threshold levels.

10. The method of claim 1, wherein post processing of the generated difference signal comprises at least one of adjusting brightness levels, adjusting highlight levels, adjusting black levels, adjusting contrast levels, adjusting gamma curve, implementing edge detection, providing a user with zoom options, or providing the user with options to view the difference signal in unprocessed form.

11. The method of claim 1, wherein the video encoding artifacts comprise at least one of block effects, mosquito noise, salt and pepper noise, contouring effects, aliasing effects, or low pass filtering effects.

12. The method of claim 1, further comprising:
adjusting, with a second computing system, one or more parameters in one or more encoding algorithms to minimize video encoding artifacts based at least in part on the enhanced video encoding artifacts revealed by the post processing of the generated difference signal.

13. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
encode an original video signal received from a video source;
decode the encoded video signal;
receive the original video signal from the video source;
synchronize one or more first frames of the received original video signal with one or more second frames of the decoded video signal;
in response to synchronizing the one or more first frames of the received original video signal with the one or more second frames of the received decoded video signal, generate a difference signal between the synchronized original video signal and the synchronized decoded video signal;
implement post processing of the generated difference signal to enhance video encoding artifacts, wherein the post-processed generated difference signal shows video encoding artifacts introduced in the one or more second frames of the received decoded video signal; and
display, with a display device, the generated difference signal showing the video encoding artifacts introduced in the one or more second frames of the received decoded video signal.

14. The apparatus of claim 13, wherein the original video signal is uncompressed.

15. The apparatus of claim 13, wherein the original video signal is compressed, wherein the set of instructions, when executed by the at least one processor, further causes the apparatus to:
decode the compressed original video signal, prior to implementing frame synchronization.

16. The apparatus of claim 13, wherein implementing frame synchronization of the received original video signal and the decoded video signal comprises synchronizing timing signals embedded in the received original video signal and the decoded video signal.

17. The apparatus of claim 16, wherein synchronizing timing signals embedded in the received original video signal and the decoded video signal comprises applying a time delay to one of the received original video signal or the decoded video signal.

18. The apparatus of claim 17, wherein applying a time delay to one of the received original video signal or the decoded video signal comprises utilizing a circular buffer.

19. The apparatus of claim 13, wherein implementing frame synchronization of the received original video signal and the decoded video signal comprises:
providing a user with manual adjustment options for frame synchronization;
receiving user selection of the manual adjustment options; and applying a time delay to one of the received original video signal or the decoded video signal based on the received user selection of the manual adjustment options.

20. The apparatus of claim 13, wherein implementing frame synchronization of the received original video signal and the decoded video signal comprises implementing frame synchronization of the received original video signal and the decoded video signal by utilizing image recognition to match frames to predetermined threshold levels.

21. The apparatus of claim 13, wherein post processing of the generated difference signal comprises at least one of adjusting brightness levels, adjusting highlight levels, adjusting black levels, adjusting contrast levels, adjusting gamma curve, implementing edge detection, providing a user with zoom options, or providing the user with options to view the difference signal in unprocessed form.

22. The apparatus of claim 13, wherein the video encoding artifacts comprise at least one of block effects, mosquito noise, salt and pepper noise, contouring effects, aliasing effects, or low pass filtering effects.

23. The apparatus of claim 13, wherein the set of instructions, when executed by the at least one processor, further causes the apparatus to:
adjust one or more parameters in one or more encoding algorithms to minimize video encoding artifacts based at least in part on the enhanced video encoding artifacts revealed by the post processing of the generated difference signal.

24. A system, comprising:
an encoder, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the encoder to:
encode an original video signal received from a video source; and
send an encoded video signal to a decoder;
the decoder, comprising:
at least one second processor; and
a second non-transitory computer readable medium communicatively coupled to the at least one second processor, the second non-transitory computer readable medium having stored thereon computer software comprising a second set of instructions that, when executed by the at least one second processor, causes the decoder to:
receive the encoded video signal that is sent from the encoder; and
decode the encoded video signal;
a synchronization system, comprising:
at least one third processor; and
a third non-transitory computer readable medium communicatively coupled to the at least one third processor, the third non-transitory computer readable medium having stored thereon computer software comprising a third set of instructions that, when executed by the at least one third processor, causes the synchronization system to:
receive the original video signal from the video source;
receive the decoded video signal from the decoder; and synchronize one or more first frames of the received original video signal with one or more second frames of the received decoded video signal;
a difference engine, comprising:
at least one fourth processor; and
a fourth non-transitory computer readable medium communicatively coupled to the at least one fourth processor, the fourth non-transitory computer readable medium having stored thereon computer software comprising a fourth set of instructions that, when executed by the at least one fourth processor, causes the difference engine to:
in response to synchronizing the one or more first frames of the received original video signal with the one or more second frames of the received decoded video signal, generate a difference signal between the synchronized original video signal and the synchronized decoded video signal; and
a post processor, comprising:
at least one fifth processor; and
a fifth non-transitory computer readable medium communicatively coupled to the at least one fifth processor, the fifth non-transitory computer readable medium having stored thereon computer software comprising a fifth set of instructions that, when executed by the at least one fifth processor, causes the post processor to:
implement post processing of the generated difference signal to enhance video encoding artifacts, wherein the post-processed generated difference signal shows video encoding artifacts introduced in the one or more second frames of the received decoded video signal; and
a display device, comprising:
at least one sixth processor; and
a sixth non-transitory computer readable medium communicatively coupled to the at least one sixth processor, the sixth non-transitory computer readable medium having stored thereon computer software comprising a sixth set of instructions that, when executed by the at least one sixth processor, causes the display device to:
display the generated difference signal showing the video encoding artifacts introduced in the one or more second frames of the received decoded video signal.

25. The system of claim 24, further comprising a first computing system comprising at least two of the encoder, the decoder, the synchronization system, the difference engine, or the post processor.

26. The system of claim 24, wherein the original video signal is uncompressed.

27. The system of claim 24, wherein the original video signal is compressed, wherein the encoder is a video transcoder that transcodes the compressed original video signal, wherein the decoder is a first reference decoder that decodes the transcoded compressed original video signal, wherein the system further comprises:
a second reference decoder, comprising:
at least one sixth processor; and
a sixth non-transitory computer readable medium communicatively coupled to the at least one sixth processor, the sixth non-transitory computer readable medium having stored thereon computer software comprising a sixth set of instructions that, when executed by the at least one sixth processor, causes the second reference decoder to:

decode the compressed original video signal, prior to being received by the synchronization system;

wherein the first reference decoder and the second reference decoder have identical hardware, software, and settings.

28. The system of claim 24, wherein post processing of the generated difference signal comprises at least one of adjusting brightness levels, adjusting highlight levels, adjusting black levels, adjusting contrast levels, adjusting gamma curve, implementing edge detection, providing a user with zoom options, or providing the user with options to view the difference signal in unprocessed form.

29. The system of claim 24, wherein the video encoding artifacts comprise at least one of block effects, mosquito noise, salt and pepper noise, contouring effects, aliasing effects, or low pass filtering effects.

30. The system of claim 24, further comprising:
a second computing system, comprising:
  at least one seventh processor; and
  a seventh non-transitory computer readable medium communicatively coupled to the at least one seventh processor, the seventh non-transitory computer readable medium having stored thereon computer software comprising a seventh set of instructions that, when executed by the at least one seventh processor, causes the second computing system to:
    modify one or more parameters in one or more encoding algorithms to minimize video encoding artifacts based at least in part on the enhanced video encoding artifacts revealed by the post processing of the generated difference signal.

* * * * *